(12) United States Patent  (10) Patent No.: US 6,453,016 B1
Chea, Jr.  (45) Date of Patent: *Sep. 17, 2002

(54) METHOD AND APPARATUS FOR DETECTING AND LOCATING A FAULT IN A TELECOMMUNICATIONS ENVIRONMENT

(75) Inventor: Ramon C. W. Chea, Jr., San Jose, CA (US)

(73) Assignee: Turnstone Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/966,488

(22) Filed: Sep. 27, 2001

Related U.S. Application Data

(63) Continuation of application No. 09/476,226, filed on Dec. 30, 1999.

(51) Int. Cl.[7] ................................................. H04M 1/24
(52) U.S. Cl. ..................... 379/29.01; 379/9.06; 379/12; 379/18; 379/22.07; 379/26.01; 379/29.03
(58) Field of Search .............................. 379/1.01, 1.04, 379/2, 9, 14.01, 22.01, 22.02, 22.03, 22.07, 26.01, 27.01, 27.06, 29.01, 29.03, 29.04, 29.05, 29.11, 30, 32.02

(56) References Cited

U.S. PATENT DOCUMENTS

| | | | |
|---|---|---|---|
| 4,126,771 A | 11/1978 | Proctor et al. | 232/175 |
| 5,550,894 A | 8/1996 | Charland | 379/2 |
| 5,553,059 A | 9/1996 | Emerson et al. | 379/29 |
| 5,661,776 A | 8/1997 | Charland | 379/2 |
| 5,761,273 A | 6/1998 | Sanders | 379/22 |
| 5,867,557 A | 2/1999 | D'Andrea et al. | 379/29 |
| 6,181,775 B1 | 1/2001 | Bella | 379/29 |
| 6,212,258 B1 | 4/2001 | Bella et al. | 379/29 |

OTHER PUBLICATIONS

ALE—Testing to the Customer Interface, British Telecommunications Engineering vol. 6 (1987) pp. 50–56.

*Primary Examiner*—Binh Tieu
(74) *Attorney, Agent, or Firm*—Pillsbury Winthrop LLP

(57) ABSTRACT

The invention presented herein is directed to a remotely addressable maintenance unit (RAMU) working in conjunction with a test head at the central office for detecting and locating faults in digital subscriber loop (DSL) and/or plain old telephone system (POTS) environments. The RAMU includes circuitry for setting and resetting one or more relays for either normal or testing/maintenance mode. The present invention provides a system and method for addressing the RAMU by applying either positive or negative voltages from the tip to ground, from ring to ground, and from tip and ring to ground. In this manner, individual RAMUs can be defined/designed to respond in certain voltage levels and polarities. Accurate fault detection and sectionalization is achieved by the combination of the addressing capabilities enumerated herein, and the impedance signature designed into the RAMU, working in concert with a test head in the central office.

16 Claims, 9 Drawing Sheets

METHOD AND APPARATUS FOR DETECTING AND LOCATING A FAULT IN A TELECOMMUNICATIONS ENVIRONMENT

This is a continuation application of U.S. Ser. No. 09/476,226, filed Dec. 30, 1999.

FIELD OF THE INVENTION

The present invention relates to a maintenance unit, and more particularly, to a remotely addressable maintenance unit (RAMU) for detecting and locating faults in digital subscriber loop (DSL) and/or plain old telephone system (POTS) environments. The RAMU of the present invention includes circuitry for setting and resetting one or more relays for either normal or testing/maintenance mode.

BACKGROUND OF THE INVENTION

Recently, there have been dramatic changes in the telecommunications industry. For example, the Telecom Act of 1996 deregulated the local markets, which, in part, brought on the emergence of new technologies to this industry. These changes are also sparked by the growing demand for Internet access and for new technologies that deliver higher speed connections over existing infrastructure.

As is well known in the industry, Digital Subscriber Loop, or DSL, is one of the most promising new technologies for delivering superior service and higher speed connections over existing infrastructure. In general, DSL uses the existing copper loop that is used for conventional telephony, but delivers much higher bandwidth. However, to achieve such high data rates, DSL operates at a higher frequency and is thus more sensitive to the length and quality of the copper loop. As a result, more sophisticated levels of testing, monitoring, and maintenance are required for successful DSL deployment.

Currently, the transmission rates for DSL technologies are very much dependant on the distance between a telephone company and a customer. Moreover, depending on the type of DSL technology, the transmission rate downstream to the customer and upstream to a telephone company may vary. For example, for asymmetric DSL, the transmission rate is faster downstream to the customer than upstream to the telephone company. Asynmmetric DSL is well suited for Internet usage and video on demand. For symmetric DSL, the transmission rate is about the same for both downstream and upstream.

DSL uses packet switching technology that operates independently of voice telephone system, allowing telephone companies to provide the service and not lock up circuits for long distance calls. In addition, DSL can carry both voice and data signals simultaneously, in both directions, allowing the customer to log onto the Internet and make a telephone call at the same time.

One major issue for those in this industry is the testing and maintenance of such systems. Currently, there exists a two-terminal testing device that is applied in the POTS (plane old telephone system) environment, which, in general, has been unsuccessful in the DSL environment.

FIG. 1 illustrates a simplified diagram of a POTS environment having a conventional maintenance test unit (MTU). In the conventional POTS environment, a central office (CO) 2 is connected to a customer's telephone 8 using a pair of copper wires 4. The CO 2 includes a testing instrument such as a test head 3 for performing the testing and maintenance functions. In between the CO 2 and the telephone 8, there lies a network interface device (NID) such as the MTU 6. There may be multiple telephones 8 and a single MTU 6 connected to one pair of wires 4 in the conventional POTS environment. In additional, other conventional devices (i.e., switches), which are not illustrated herein, may also be implemented in this environment.

The MTU 6 illustrated herein is generally intended for a single party, loop-start line, voice frequency band POTS environment implementation. This is intended to be compatible with conventional test systems such as Local Test Disk (LTD), Mechanized Loop Testing (MLT), CK08555 (KS-8455) voltmeter, Automatic Line Insulation Test (ALIT), and the like.

FIG. 2 illustrates a diagram of an existing circuit used in the POTS environment as shown in FIG. 1. In the CO 2, the test head 3 (i.e., LTD, MLT) typically includes a power source 10 such as DC voltage $V_{dc}$, current limiting resistor 12, and two terminals 14, 16, which are further connected to relay(s) 18. The relay(s) 18 allows the two terminals 14, 16 to connect to a tip wire 20 (tip) and/or a ring wire 22 (ring). As is well known, tip and ring are terms used for describing the two wires that are needed to set up a telephony connection.

The MTU 6 includes a pair of voltage sensitive switches ($V_{ss}$), where one $V_{ss}$ 24 is coupled to the tip 20 and the other $V_{ss}$ 26 is coupled to the ring 22. In addition, a termination impedance $Z_t$ 28 is paced in between the two $V_{ss}$ 24, 26, at a location near the customer's telephone 8. The termination impedance $Z_t$ 28 is a signature impedance that works in conjunction with the CO 2 test systems for fault identification and localization.

Testing in the conventional POTS environment is generally performed using only two terminals, tip 20 and ring 22. The conventional testing method is generally acceptable in the POTS environment, but as will be described hereinafter, in the DSL environment, a more improved system and method is needed.

The conventional testing system and method used in the POTS environment have many shortcomings and disadvantages. For example, one major disadvantage with the conventional system and method is that many fault conditions cannot be detected or located with exact precision, thereby requiring truck rolls. As a result, the conventional testing system and method require a great deal of time and resources to locate and determine the type of faults, which generally results in lost revenues and a more than desirable fix time for the operating company and the customer. An additional disadvantage using the conventional system and method is that phones are required to be connected to the tip and ring for testing for some type of fault identification and localization, which in many cases, can be quite burdensome.

FIG. 3 illustrates a chart showing how the conventional MTU responds to different voltage levels as measured from tip to ring. For example, when the voltage difference from tip to ring is between +35 to +65 volts, this is indicative of normal or talk mode (ON mode), where the MTU is in a low impedance state. Conversely, the same behavior can be achieved when the voltage difference is reversed, as between −35 to −65 volts from tip to ring.

When the voltage difference is dropped between −28 to +28 volts, the MTU 6 is turned off and it is in a high impedance state. Further, when the voltage difference from tip to ring is between +70 to +120 volts or between −70 to −120 volts, the voltage sensitive switches $V_{ss}$ 24, 26 are turned on, placing them in low impedance states. Furthermore, these voltages activate impedance signature $Z_t$ 28, providing the so-called distinctive terminations to be detected by the test systems at the CO 2. The impedance readings should be between 150 K to 450 K ohms when measured with +70 to +120 volts, and be equal or greater than 100 M ohms when the voltage is between −70 to −120 volts.

As DSL technology continues to evolve, the conventional system and method using the MTU 6 is generally inadequate for testing/maintenance in the DSL environment. Most DSL circuits do not have batteries connected thereto ("dry circuit"), and thus the MTU 6 will typically not function properly under this environment.

Another disadvantage of the conventional system and method is that the MTU 6 is typically implemented only with ILECs (Incumbent Local Exchange Carriers), which utilize their customized test systems to control and interwork with the MTU 6. The CLECs (Competitive Local Exchange Carrier), which are in direct competition with the ILECs in the marketplace, currently do not have such testing/maintenance systems to work with the MTUs. Installing such test systems is a very costly proposition for the CLECs.

Thus, there is a need for a system and method for providing a remotely addressable maintenance unit for the DSL and POTS/DSL environments for both CLECs and ILECs. There is also a need for implementing a remotely addressable maintenance unit in existing infrastructures in current POTS environment for improved performance.

SUMMARY OF THE INVENTION

It is an object of the present invention to provide a remotely addressable maintenance unit for the POTS, DSL, and POTS/DSL environments.

It is another object of the present invention to provide a system and method for verifying connections between the central office and the remotely addressable maintenance units.

It is yet another object of the present invention to provide a system and method for locating and determining faults between the central office and the customer's house/building.

It is a further object of the present invention to provide a system and method for identifying the tip and ring wires using a "Signature."

It is yet another object of the present invention to provide galvanic isolation of inhouse wiring from an outside plant.

It is another object of the present invention to provide a system and method for detecting loop faults, including open and short circuits.

It is another object of the present invention to provide sealing currents to the copper wires used between the central office and the customer's house/building using the remotely addressable maintenance unit.

It is still a further object of the present invention to provide a system and method for remotely terminating service with a predetermined impedance to a particular customer using the remotely addressable maintenance unit for a loop only noise measurement.

It is yet another object of the present invention to provide a system and method for determining loop resistance in existing copper loops.

These and other objects of the present invention are obtained by providing a remotely addressable maintenance unit (RAMU) that can be used in the POTS, DSL, and POTS/DSL environments. The RAMU of the present invention includes circuitry, working in conjunction with test systems located in the CO, for detecting and locating (sectionalizing between in-house and out-house) faults in the POTS, DSL, and POTS/DSL environments. The RAMU further includes circuitry for setting and resetting one or more relays for normal or test/maintenance mode. A test head is placed at the CO, which works in conjunction with a "Signature" in the RAMU for performing testing and maintenance tasks on the copper loop. The RAMU of the present invention can also be used to provide a sealing current to the wires in the DSL environment. Furthermore, the RAMU eliminates/reduces truck rolls through a more thorough and accurate diagnosis of fault types and localizations, thereby saving valuable time and resources for both the ILECs and the CLECs.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
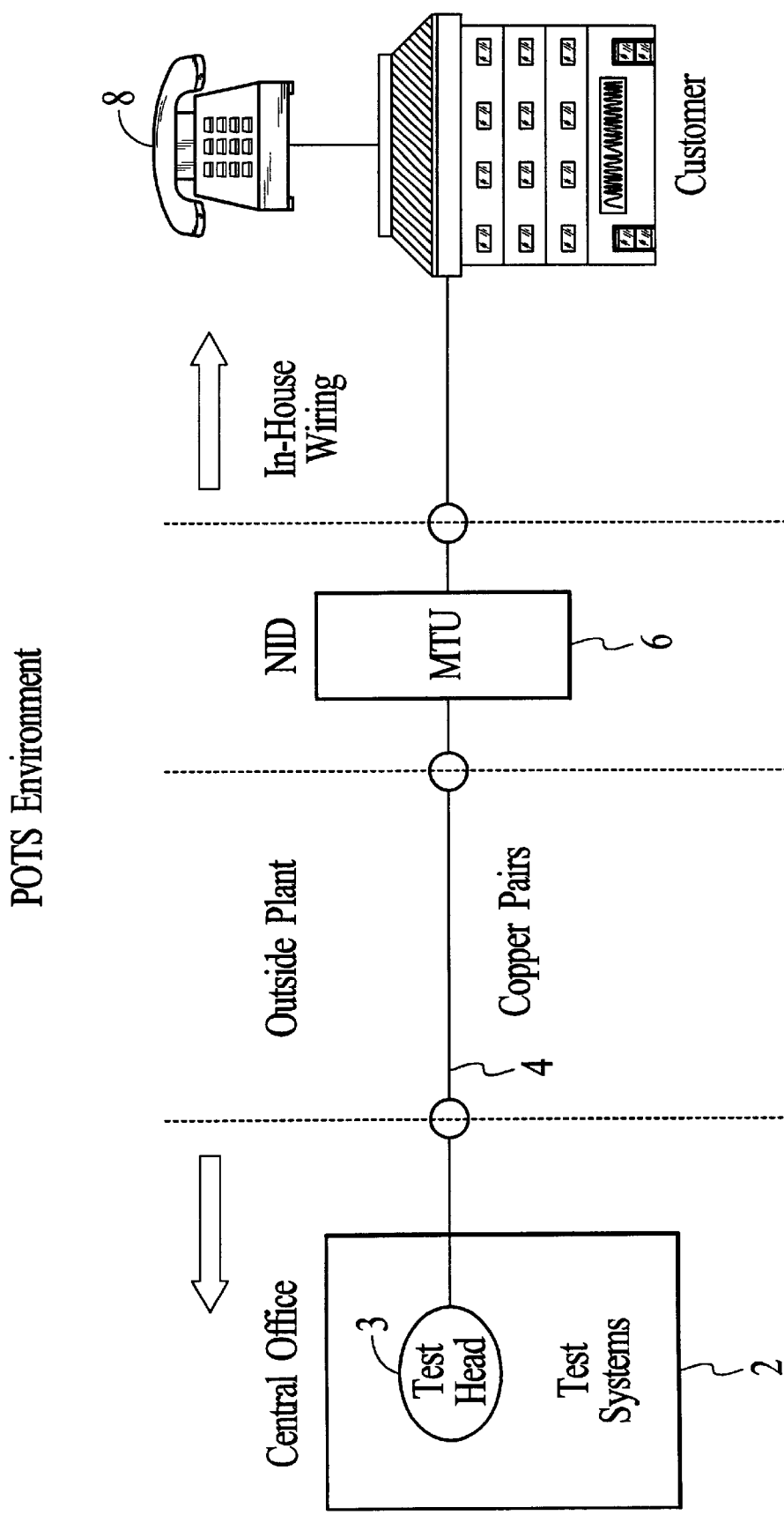
FIG. 1 illustrates a simplified diagram of a POTS environment having a conventional maintenance test unit.
Figure 2:
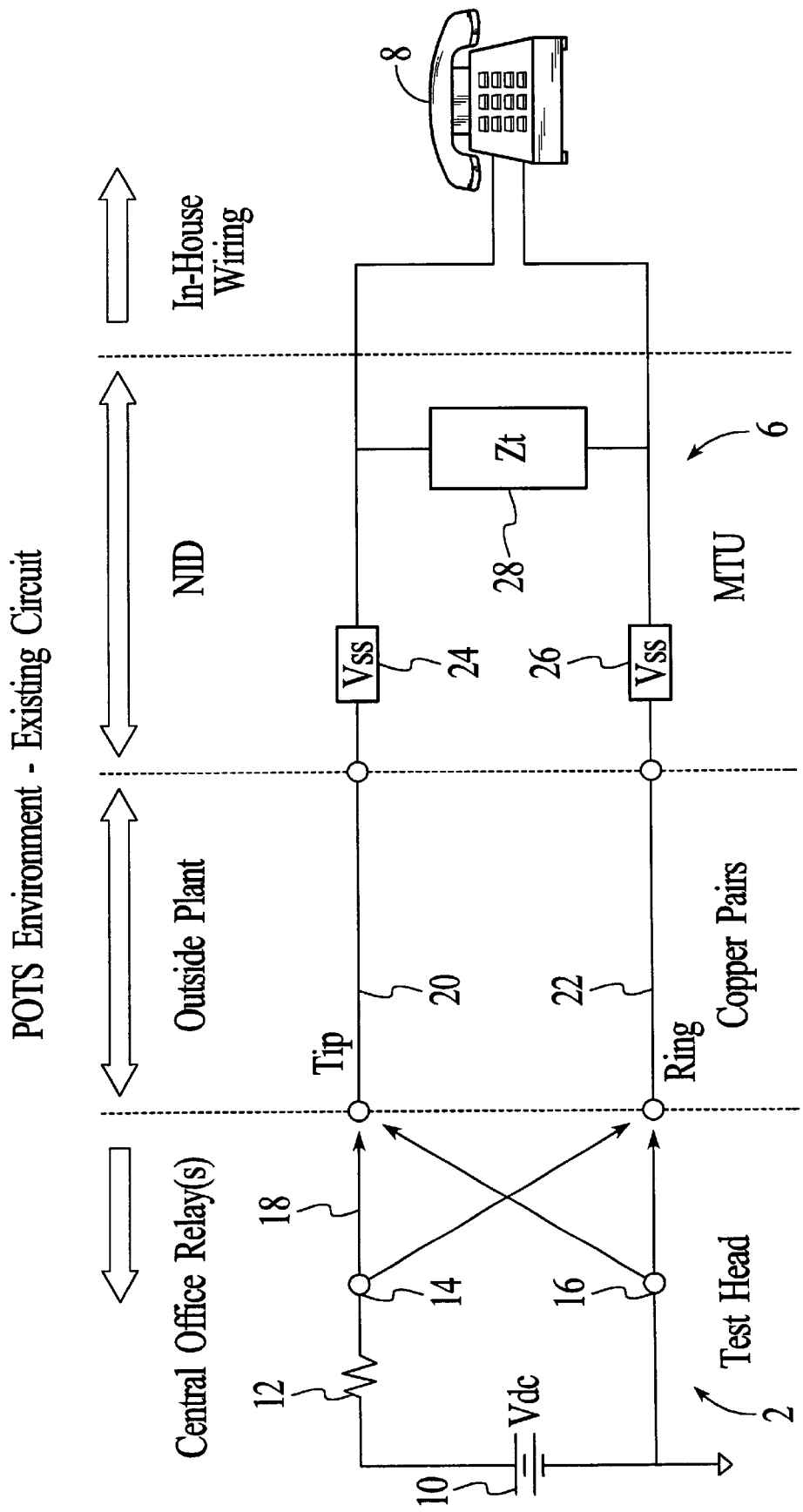
FIG. 2 illustrates a diagram of an existing circuit used in the POTS environment as shown in FIG. 1.
Figure 3:
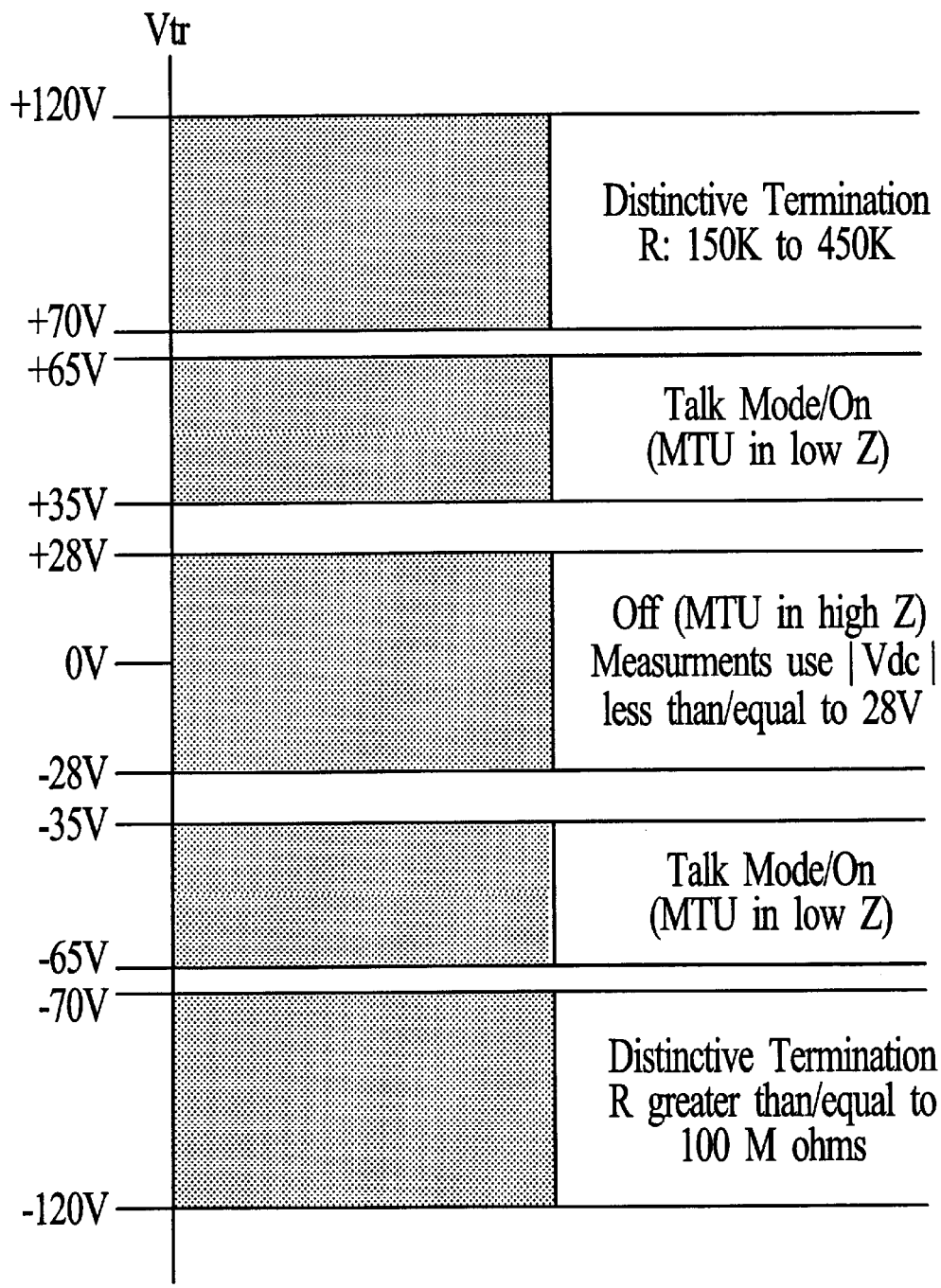
FIG. 3 illustrates a chart showing how the conventional MTU responds to different voltage levels as measured from tip to ring.

The present invention will now be described in greater detail, which will serve to further the understanding of the preferred embodiments of the present invention. As described elsewhere herein, various refinements and substitutions of the various embodiments are possible based on the principles and teachings herein.

The preferred embodiments of the present invention will be described with reference to FIGS. 4–8, wherein like components and steps are designated by like reference numerals throughout the various figures. Further, specific parameters such as potential differences, voltage values, circuit layouts, and the like are provided herein, and are intended to be explanatory rather than limiting.

Figure 4:
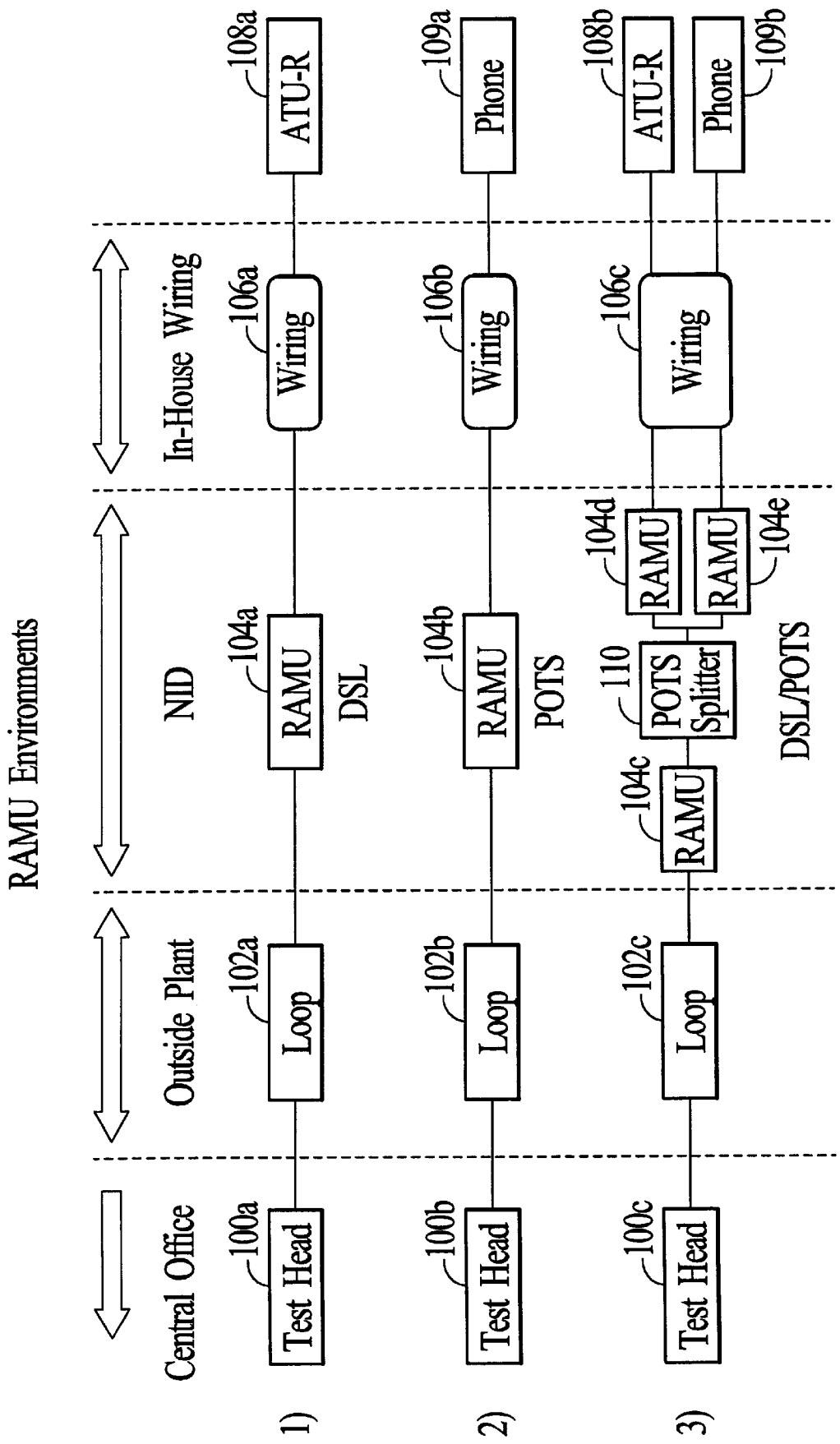
FIG. 4 illustrates block diagrams of various environments implementing the RAMU in accordance with the present invention.

FIG. 4 illustrates block diagrams of various environments implementing the RAMU in accordance with the present invention. In the first environment, DSL, a test head 100a with a conventional processor board such as a P150 processor (e.g., CX100 Copper CrossConnect system of Turnstone Systems, Inc.) in the central office (CO) is connected to a loop (copper pair) 102a in the outside plant. The loop 102a is further connected to a RAMU 104a, which in turn is connected to the in-house wiring 106a. An ATU-R (ADSL transceiver remote unit) 108a or a similar end unit is further connected to the in-house wiring 106a, generally in the customer's house/building. Unlike the conventional system and method, the RAMU 104a is implemented instead of the MTU, where the RAMU 104a is used for testing and maintenance.

In a similar manner, the RAMU can be implemented in a second POTS environment, again using a test head 100b having a processor such as a P150 processor, which is connected to a loop 102b. The RAMU 104b is connected to both the loop 102b and the in-house wiring 106b, which terminates with a conventional analog phone 109a. The system in the second POTS environment is similar to the first DSL environment except that the phone 109a, instead of the ATU-R 108a, is the end unit. These examples illustrate that the RAMU of the present invention can be easily implemented in both DSL and POTS environments.

In yet another embodiment of the present invention, the RAMU can be implemented in an environment using both DSL and POTS concurrently. For example, in a third DSL/POTS environment, a test head 100c is again connected to a loop 102c, which in turn is connected to a first RAMU 104c. The first RAMU 104c is further connected to a POTS splitter 110, which is used to split the wires for connection to a second RAMU 104d and a third RAMU 104e. As shown, the POTS splitter 100 can be implemented in a star topology, or in the alternative, other topologies such as a ring. The second and third RAMUs 104d, 104e are further connected to the in-house wiring 106c, which terminate at the ATU-R 108b and phone 109b, respectively. The RAMUs 104a, 104b, 104c, 104d, 104e, are preferably placed at the network interface on the outside of the customer's house/building in which the outside plant copper wires for the access network terminate. In the alternative, the RAMUs 104a, 104b, 104c, 104d, 104e, can be placed inside the house/building structure.

Figure 5A:
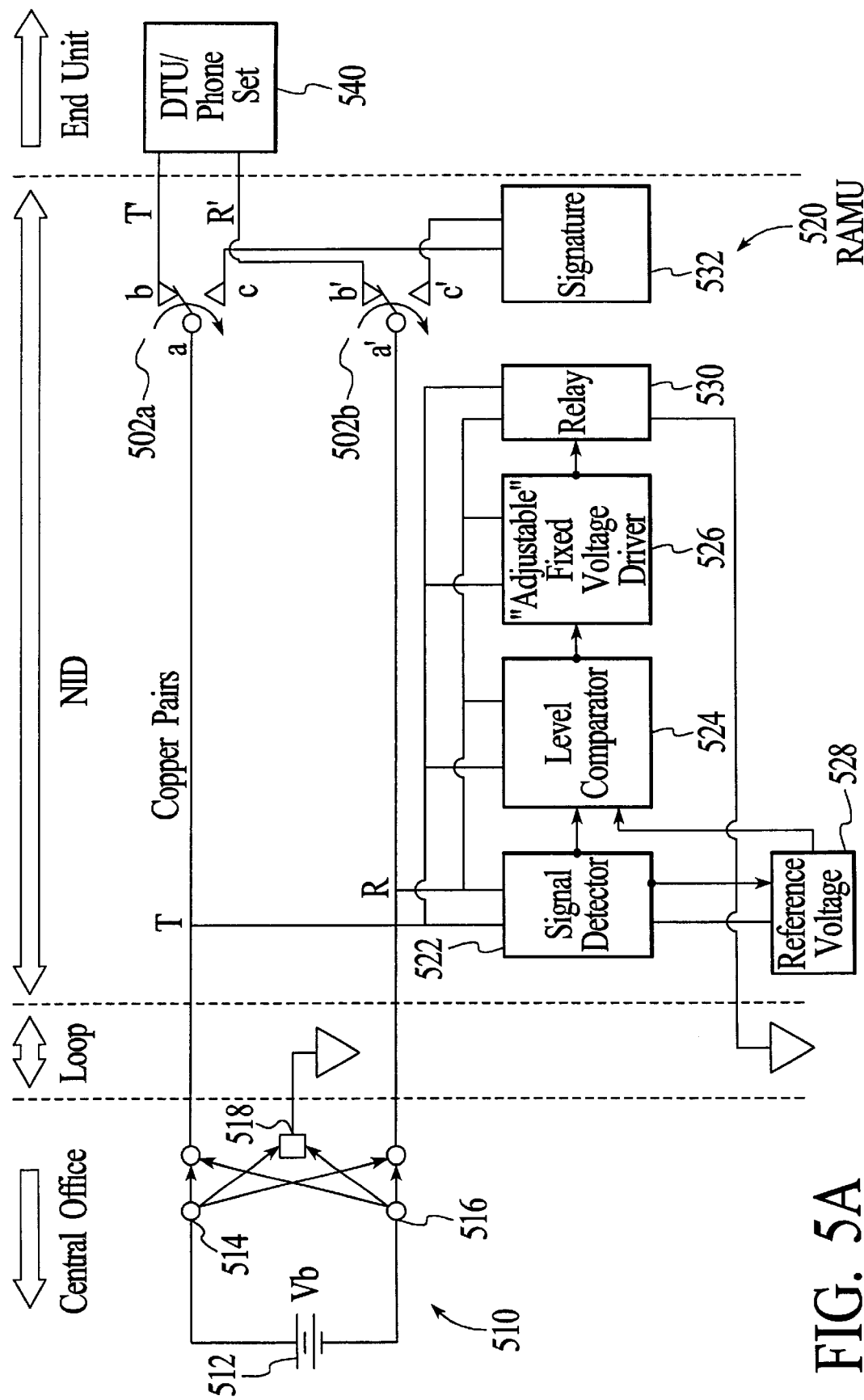
FIG. 5A illustrates a functional block diagram of the RAMU in accordance with the present invention.
Figure 5B:
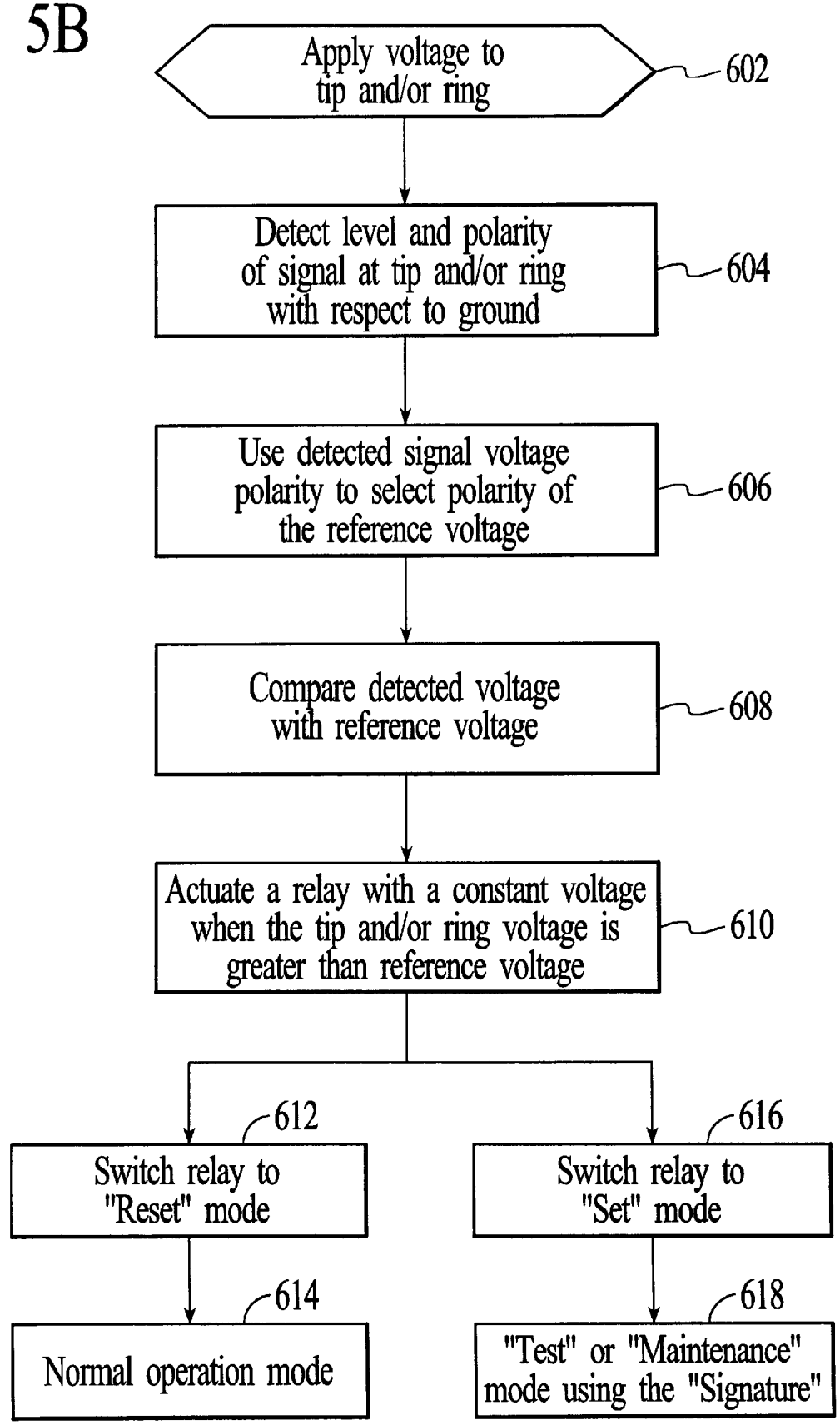
FIG. 5B illustrates a flow diagram showing the steps performed by the RAMU in accordance with the present invention.

FIG. 5A illustrates a functional block diagram of the RAMU and FIG. 5B illustrates a flow chart of the steps performed by the RAMU in accordance with the present invention. Referring first to the RAMU 520 in FIG. 5A, two switches 502a, 502b are used to indicate "reset" and "set" modes, which depends on the magnitude, polarity, and duration of an electric signal. For example, when a contact point a is connected to a contact point b via switch 502a and a contact point a' is connected to a contact point b' via switch 502b (as explicitly shown in FIG. 5A), the RAMU is in the "reset" or normal mode. In the alternative, when the contact point a is connected to the contact point c via switch 502a, and the contact point a' is connected to the contact point c' via switch 502b, the RAMU is in "set" or testing/maintenance mode. Thus, when the RAMU is subjected to an electrical impulse representing either the "reset" or "set" control signal of proper magnitude, polarity, and duration, the RAMU will switch to either the "reset" or "set" mode and will remain in that mode even upon removal or cessation of the control signal. The magnitude, polarity, and duration of the "reset" and "set" control signals for the RAMU are dependent on the specific application environment, and is generally defined/design into the RAMU and the CO 510 before deployment of the RAMU outside the CO 510. A more detailed description regarding the specific circuit diagram and the conditions for the "reset" and "set" modes are disclosed later herein.

In the CO 510, there exists a power source $V_b$ 512 and two terminals 514, 516, which can be connected to the tip (T), ring (R) and/or ground wires. One important feature of the present invention is that the two terminals 514, 516 can now be connected to the ground 518. In this manner, the functional capabilities of the system is expanded as follows: (1) increases the addressing capabilities of the system, allowing multiple devices to be connected to the same copper pair; (2) de-couples the address signals (i.e., DC voltage levels that are used to control the RAMU) from voltages that are used for applications, such as for measurements and sealing current, and hence significantly minimizes interference between voltages representing control/addressing and applications; and (3) address or control bi-stable devices that can be used in the physical implementation of the RAMU.

Thus, in the preferred embodiment, using appropriate voltage magnitude and duration, "set" mode is indicative when there is a positive polarity from tip to ground, ring to ground, or tip and ring to ground. Conversely, again using appropriate voltage magnitude and duration, "reset" mode is indicative when there is a negative polarity from tip to ground, ring to ground, or tip and ring to ground. In addition, signals that have an amplitude equal to at least twice or greater than the amplitude of the "set" or "reset" control signals, applied between the tip and ring, will not have any effect on the "present" state of the RAMU.

Figure 6:
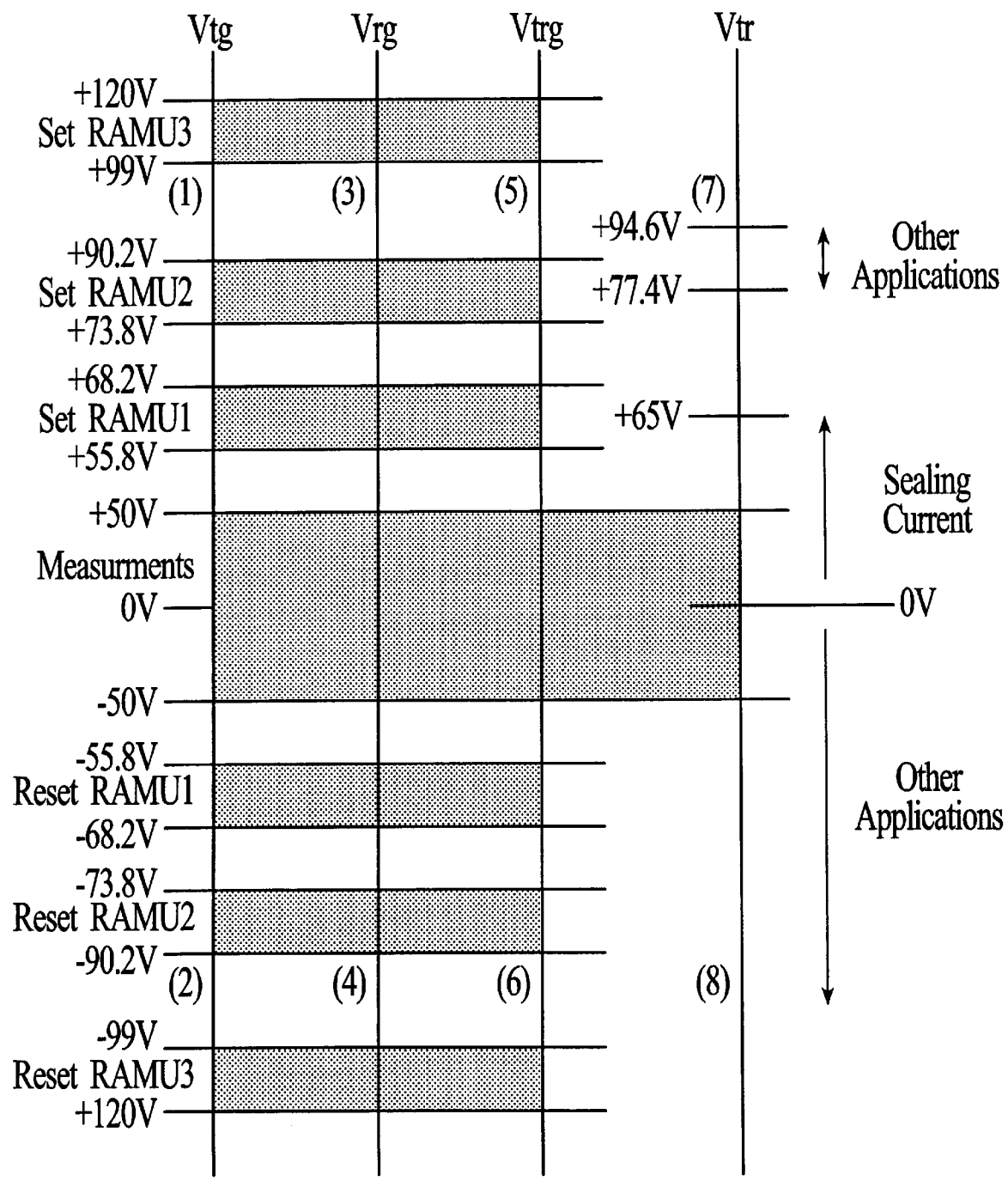
FIG. 6 illustrates an example of the RAMU signaling definition of the present invention.

FIG. 6 illustrates an example of a RAMU signaling definition of the present invention. In greater detail, FIG. 6 shows eight different conditions/quadrants for addressing the RAMU: (1) $V_{tg}$ (voltage from tip to ground) with positive polarity; (2) $V_{tg}$ (voltage from tip to ground) with negative polarity; (3) $V_{rg}$ (voltage from ring to ground) with positive polarity; (4) $V_{rg}$ (voltage from ring to ground) with negative polarity; (5) $V_{trg}$ (voltage from tip and ring to ground) with positive polarity; (6) $V_{trg}$ (voltage from tip and ring to ground) with negative polarity; (7) $V_{tr}$ (voltage from tip to ring) with positive polarity; and (8) $V_{rg}$ (voltage from tip to ring) with negative polarity. Certain conditions/quadrants (e.g., 1, 2, 3, 4, 5, 6) can be used for addressing and other conditions/quadrants (e.g., 7, 8) can be used for applications. Voltage range between −50V to +50 for all combination of tip, ring, and ground configurations ($V_{tg}$, $V_{rg}$, $V_{trg}$, $V_{tr}$) have been reserved for measurements and other industry applications such as parameter measurements and telephonic functions.

The "reset" mode can be actuated with a negative polarity using a $V_{tg}$, $V_{rg}$, or $V_{trg}$ condition, using arbitrary voltages range (i.e., preferably, at a range less than −50V but greater than −120V), which ranges are pre-defined/pre-designed. Conversely, the "set" mode can be actuated with a positive polarity using a $V_{tg}$, $V_{rg}$, or $V_{trg}$ condition, using arbitrary voltage ranges (i.e., preferably, at a range less than +120V but greater than +50V), which ranges are pre-defined/pre-designed. In additional, a particular voltage range that actuates the "set" mode should include a reciprocal voltage range to actuate the "reset" mode (i.e., 55.8V to 68.2V for "set" mode and −68.2V to −55.8V for "reset" mode).

Each individual RAMU can be defined/designed to only respond to a certain voltage range. For example, one can "set" one particular RAMU to respond in the +55.8 to +68.2 voltage range, and "reset" in the −55.8 to −68.2 voltage range. In the same manner, another RAMU can be "set" and "reset" to respond in the +73.8 to +90.2 voltage range, and −73.8 to −90.2 voltage range, respectively. In this manner, multiple RAMUs can be remotely addressable from the CO 510 by providing different voltages and polarities to the tip and/or ring to ground. Further, installing multiple RAMUs at different locations between the CO 510 and the customer's house/building provides a way to determine the exact location and type of fault in any environment.

Additionally, a sealing current can be provided to the wires using the $V_{tr}$ condition and in conjunction with a properly designed signature impedance. Thus, voltage between 0 to +65 volts can be applied from tip to ring using the RAMU to provide a sealing current to the copper wires. Other applications such as loop powered tone generation can be performed by providing other voltages to the ring and tip in the $V_{tr}$ configuration. It is also noted that in FIG. 6, the voltage ranges are for illustrative purposes only and other practical voltages ranges can be substituted for those illustrated therein.

Referring back to FIG. 5A and as mentioned earlier herein, the RAMU can be placed at the network interface outside of the customer's house/building in which the outside plant copper wires for the access network terminate, which wires are connected to contact points a and a'. In the DSL or POTS environment, there is typically a DTU (Digital Termination Unit)/phone set 540 connected to the contact points b and b' through a pair of copper wires. When the DTU/phone set 540 is connected to the contact points a and a', via the contact points b and b', this represents the "reset" or normal mode. Conversely, when the RAMU is in the "set" or testing/maintenance mode, the DTU/phone set 540 is disconnected from the contact points a and a', and such contact points are connected to a Signature 532 via the contact points c and c'.

The Signature 532 is preferably a passive network or active circuit elements that perform a specific function, as described in more detail hereinafter. The Signature 532 contains specific circuitry designed to identify the presence of the RAMU. The Signature 532 can also perform the function of a resistance, which is used to detect fault conditions in the tip and ring, loop length measurements, and a DC path for a sealing current to "wet" the loop.

The RAMU 520 further includes the following functional blocks: Signal Detector 522, Level Comparator 524, "Adjustable" Fixed Voltage Driver 526, Reference Voltage 528, and Relay 530. As shown, the RAMU 520 can be connected to the CO 510 at the T and R wires, and to the customer's house/building via the T' and R' wires.

Reference will now be made to both FIGS. 5A and 5B concurrently for a more complete understanding of the present system and method. First, in step 602, a voltage is applied to T and/or R. In step 604, the Signal Detector 522 coupled to the T and R detects the polarity of the signal and voltage level at the T and/or R with respect to ground. The polarity of the detected signal is then fed into the Reference Voltage 528 to select a polarity for the reference voltage in step 606. The Reference Voltage 528 contains pre-defined voltage amplitude whose polarity selections are controlled by a signal from the Signal detector 522. The Reference Voltage 528 can also be adjustable depending on the type and values of the hardware components used in a particular circuitry.

The voltage with the proper polarity from the Reference Voltage 528 is then inputted into the Level Comparator 524, which is also coupled to the Signal Detector 522 and the Reference Voltage 528. The Level Comparator 524 compares the T and/or R voltages with the reference voltage from the Reference Voltage 528 in step 608. In step 610, when the value of the voltage from the T and/or R is greater than the reference voltage, an enable signal is generated by the Level Comparator 524 and inputted into the Fixed Voltage Driver 526, for enabling the same.

The Fixed Voltage Driver 526 consists of a switching function and a fixed voltage circuitry. The switching function controls the application of a fixed voltage to drive the Relay 530. The combination of the fixed voltage with a coil resistance of the Relay 530, which is generally fixed for a given relay type, forms a "constant current source." The current flowing through the Relay 530 is not affected by further increases in the voltage at the T and/or R. In other words, once the circuitry detects a voltage at the T and/or R, which exceeds a pre-defined value, the Fixed Voltage Driver 526 applies a constant voltage and actuates the Relay 530. The resultant current flowing through the Relay 530 is also unaffected by further increase in voltages at the T and R. This is an essential feature of the present invention to provide optimum operations. In addition, the fixed voltage driver value can be further adjusted to accommodate a different voltage rating of a particular relay.

The Relay 530 is preferably a latching-type relay (includes memory), which could be either electromechanical or semiconductor solid state. The latching-type feature is essential in that once the applied voltage exceeds a pre-defined reference voltage, a constant voltage is applied to actuate the Relay 530. Once the Relay 530 is actuated, the "set" or "reset" control voltage can be subsequently removed, resulting in minimum or no power dissipation. The latching-type feature is also essential because it can then allow application of a voltage across the T and R to perform other functions without affecting the Relay 530.

Figure 7:
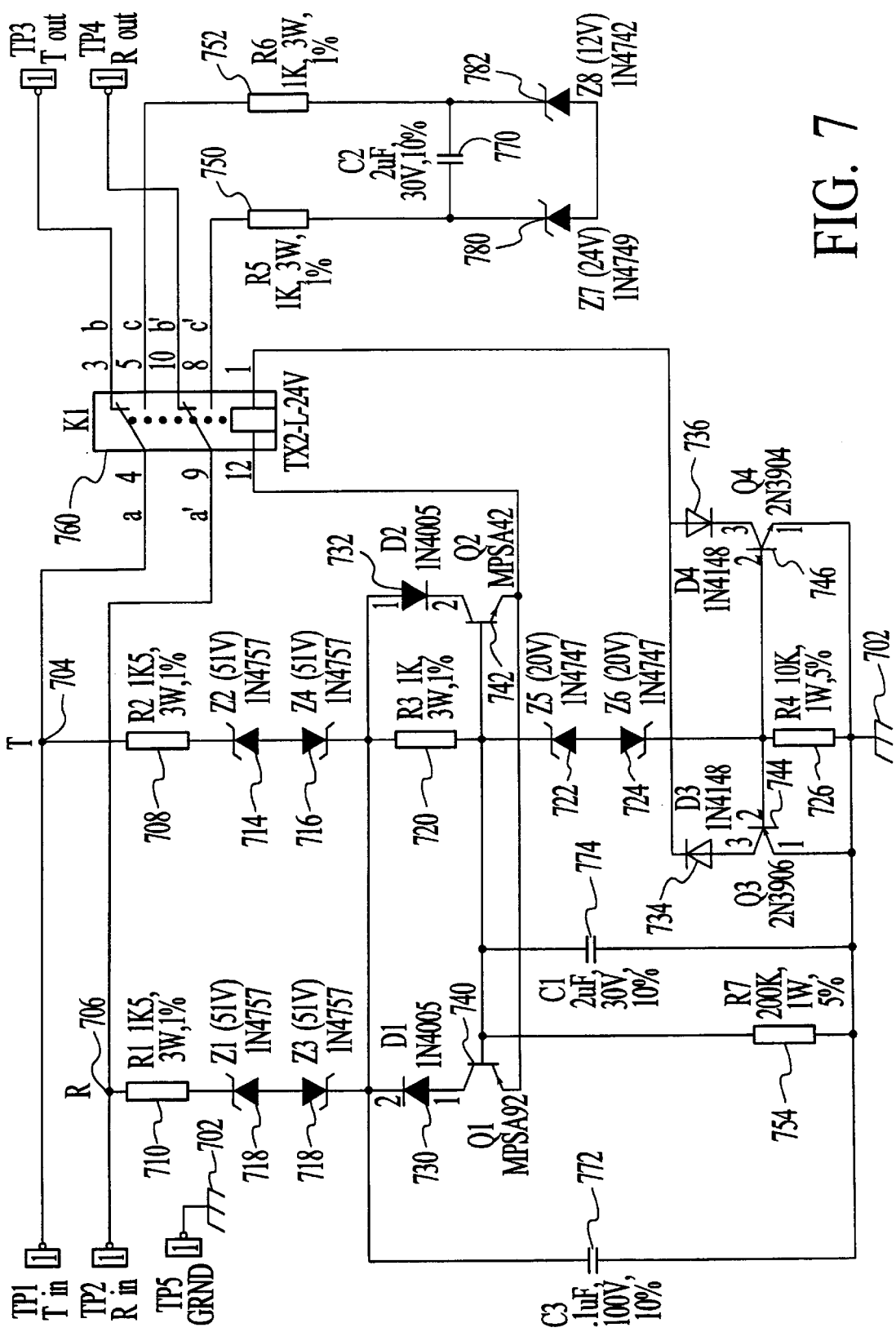
FIG. 7 illustrates a detailed circuit diagram in accordance with the present invention.

FIG. 7 illustrates an example of a detailed circuit diagram that can be used in the present invention. Functionally, the Signal Detector 522 includes the diodes D1 730, D2 732, D3 734, D4 736, and transistors Q1 740, Q2 742, Q3 744, Q4 746. The Level Comparator 524 uses the voltages associated with zener diodes Z1 712, Z3 718 or Z2 714, Z4 716, in conjunction the voltages associated with zener diodes Z5 722, Z6 724. Next, the Reference Voltage 528 is set by choosing a combination of voltages associated with zener diodes Z1 712, Z3 718 or Z2 714, Z4 716, with voltages associated with zener diodes Z5 722 or Z6 724. The zener diodes Z1 712, Z2 714, Z3 718, Z4 716, Z5 722, Z6 724 perform dual functions for the Level Comparator 524 and the Reference Voltage 528.

The Fixed Voltage Driver 526 includes zener diodes Z5 722, Z6 724. Adjustments/modifications to the Fixed Voltage Driver 526 can be made by selecting the voltages associated with zener diodes Z5 722, Z6 724. For symmetrical operation, zener diodes Z5 722, Z6 724 can have identical values such as approximately 20V. Once the zener diode voltages are known, the voltage required to drive the Relay 530 is also known (i.e., 20V).

The Relay 530 is defined by K1 760, which can have the following characteristics: 24V rated, single coil, two form-c contacts, and latching-type. In other embodiments, a different rated voltage relay can be used in the circuitry of FIG. 7. Note that since the Relay K1 760 is rated at 24V, the actual voltage to drive/actuate it is about 19.8V as defined by Z5 722 (20.0V), in conjunction with forward drop of Z6 724 (0.7V), plus the $V_{be}$ (base to emitter voltage drop) of Q4 746 (0.7V), minus the $V_{be}$ of Q2 742 (0.7V), minus the $V_{ce}$ (collector to emitter) saturation voltage of Q4 746 (0.2V), minus the forward drop ($V_{be}$) of D4 736 (0.7V).

The Signature 532 includes resistors R5 750, R6 752, capacitor C2 770, and zener diodes Z7 780, Z8 782. Voltages for the zener diodes Z7 780 and Z8 782 are selected to be different from each other to enable identification of either the tip or ring. Resistors R5 750, R6 752 and capacitor C2 770 together provide the proper AC termination impedance for testing operations. This also allows a DC current path to be present for the "wetting or sealing current" of the loop.

The circuitry also includes a capacitor C3 772 for lightning surge suppression and a resistors R1 710, R2 708 for limiting a surge current. The capacitor C1 774 is used to filter out ringing signals that may be present, and for preventing erroneous circuit operations due to transient voltages that may be present. The resistor R7 754 is used to dissipate charges stored in the capacitor C1 774.

During operation, when a positive voltage with respect to the ground is applied to the T 704 while the R 706 is left open, and the applied voltage is greater than the combined voltages set by zener diodes Z2 714, Z5 722 and the forward diode voltage drops for zener diodes Z4 716, Z6 724 (i.e., typically 0.7 volts), current will begin to flow through the resistor R2 708, zener diodes Z2 714, Z4 716, resistor R3 720, zener diodes Z5 722, Z6 724, and resistor R4 726. As the voltage from T 704 continues to increase, so does the voltage at resistor R4 726. When the voltage level increases to a value of $V_{be}$ (which is approximately 0.7V) for the transistor Q4 746, a base current is injected, which turns on transistors Q4 746, Q2 742. Current then begins to flow through relay K1 760, actuating the relay K1 760 in the "set" mode. The relay current path is through resistor R2 708, zener diodes Z2 714, Z4 716, diode D2 732, transistor Q2 742, relay K1 760, diode D4 736, and transistor Q4 746. The voltage across the relay K1 760 is defined by the voltage of zener diode Z5 722, $V_{be}$ drops for zener diode Z6 724, transistors Q2 742, Q4 746 and diode D4 736. Since the voltage of the zener diode Z5 722 is usually much greater than the combined $V_{be}$'s, the voltage across the relay K1 760 is essentially the voltage of zener diode Z5 722. The voltage is "impressed" across the relay K1 760 with a coil fixed resistance and produces a fixed current through the relay K1 760, which is independent of the voltage. Another key feature of the present invention is the combined effect of a fixed voltage across the relay K1 760, which is turned on only when the T and/or R voltage reaches a pre-defined voltage, and thus results in an "interlock" mechanism. This interlock mechanism applies to all subsequent operations that are discussed hereinafter.

When a negative voltage with respect to ground is applied to the T, while the R is left open, and the applied voltage is greater than the combined voltages set by zener diodes Z6 724, Z4 716 and the forward diode voltage drops for zener diodes Z5 722, Z2 714, current will begin to flow through resistor R4 726, zener diodes Z6 724, Z5 722, resistor R3 720, zener diodes Z4 716, Z2 714, and resistor R2 708. As the applied voltage continues to increase across the T, so does the voltage at resistor R4 726. When the voltage level increases to a value of $V_{be}$ for the transistor Q3 744, current is injected, turning on transistors Q3 744, Q1 740. Current then begins to flow through relay K1 760, actuating the relay K1 760 to the "reset" mode.

When a positive voltage with respect to ground is applied to the R, while the T lead is left open, and the applied voltage is greater than the combined voltages set by zener diodes Z1 712, Z5 722 and the forward diode voltage drops for zener diodes Z3 718, Z6 724, current will begin to flow through resistor R1 710, zener diodes Z1 712, Z3 718, resistor R3 720, zener diodes Z5 722, Z6 724, and resistor R4 726. As the voltage increases at R, the voltage at the resistor R4 726 also increases. When the voltage increases to the $V_{be}$ value for the transistor Q4 746, base current is injected, turning on transistors Q4 746, Q2 742. Current then begins to flow through relay K1 760, actuating the relay K1 760 in the "set" mode. The relay current path is through resistor R1 710, zener diodes Z1 712, Z3 718, diode D2 732, transistor Q2 742, relay K1 760, diode D4 736, and transistor Q4 746. The voltage across the relay K1 760 is defined by the voltage of zener diode Z5 722, $V_{be}$ drops for zener diode Z6 724, transistors Q2 742, Q4 746, and diode D4 736. Again, since the voltage associated with the zener diode Z5 722 is usually greater than the $V_{be}$'s, the voltage across the relay K1 760 is essentially the voltage of zener diode Z5 722.

When a negative voltage with respect to ground is applied at the R 706, while the T lead 704 is left open, and the applied voltage is greater than the combined voltages set by zener diodes Z6 746, Z3 718 and the forward diode voltage drops for zener diodes Z5 722, Z1 712, current will begin to flow through resistor R4 726, zener diodes Z6 724, Z5 722, resistor R3 720, zener diodes Z3 718, Z1 712, and resistor R1 710. As the applied voltage increases, the voltage across the resistor R4 726 will also increase. When it reaches the $V_{be}$ drop of transistor Q3 744, current is injected, turning on transistors Q3 744, Q1 740. Current then begins to flow through relay K1 760, actuating the relay to "reset" mode.

When a positive voltage is applied to both the T and R concurrently with respect to ground, current will begin to flow when the voltage is at the combined value set by either (1) zener diodes Z2 714, Z5 722 and the forward diode voltage drops for zener diodes Z4 716, Z6 724, and/or (2) zener diodes Z1 712, Z5 722 and the forward diode voltage drops for zener diodes Z3 718 and Z6 724. As the applied voltage increases, the voltage across resistor R4 726 also increases and when it reaches the $V_{be}$ of transistor Q4 746, transistors Q4 746, Q2 742 turn on, allowing a current to flow through relay K1 760, thereby actuating the relay K1 760 in the "set" mode. The current path through the relay K1 760 is via (1) resistor R1 710, zener diodes Z1 712, Z3 718, diode D2 732, transistor Q2 742, relay K1 760, diode D4 736, and transistor Q4 746, and/or (2) resistor R2 708, zener diodes Z2 714, Z4 716, diode D2 732, transistor Q2 742, relay K1 760, diode D4 736, and transistor Q4 746.

When a negative voltage is applied to both the T and R concurrently with respect to ground, current will begin to flow when the voltage is at the combined value set by either (1) zener diodes Z4 716, Z6 724 and the forward diode voltage drops for zener diodes Z2 714, Z5 722, and/or (2) zener diodes Z3 718, Z6 724 and the forward diode voltage drops for zener diodes Z1 712 and Z5 722. As the applied voltage increases, the voltage across the resistor R4 716 also increases and when it reaches the $V_{be}$ of transistor Q3 744, transistors Q3 744, Q6 740 turn on, allowing a current to flow through relay K1 760, thereby actuating relay K1 760 in the "reset" mode. The current path through the relay K1 760 is via (1) resistor R1 710, zener diodes Z1 712, Z3 718, diode D1 730, transistor Q1 740, relay K1 760, diode D3 734, and transistor Q3 744, and/or (2) resistor R2 708, zener diodes Z2 714, Z4 716, diode D1 730, transistor Q1 740, relay K1 760, diode D3 734 and transistor Q3 744.

As described above, when relay K1 760 is in the "reset" mode, the T and R are connected to the DUT/phone set 540, which represents the normal operation mode. In the alternative, when relay K1 760 is in the "set" mode, the T and R are connected to the Signature 532, which represents the testing/maintenance mode.

Figure 8:
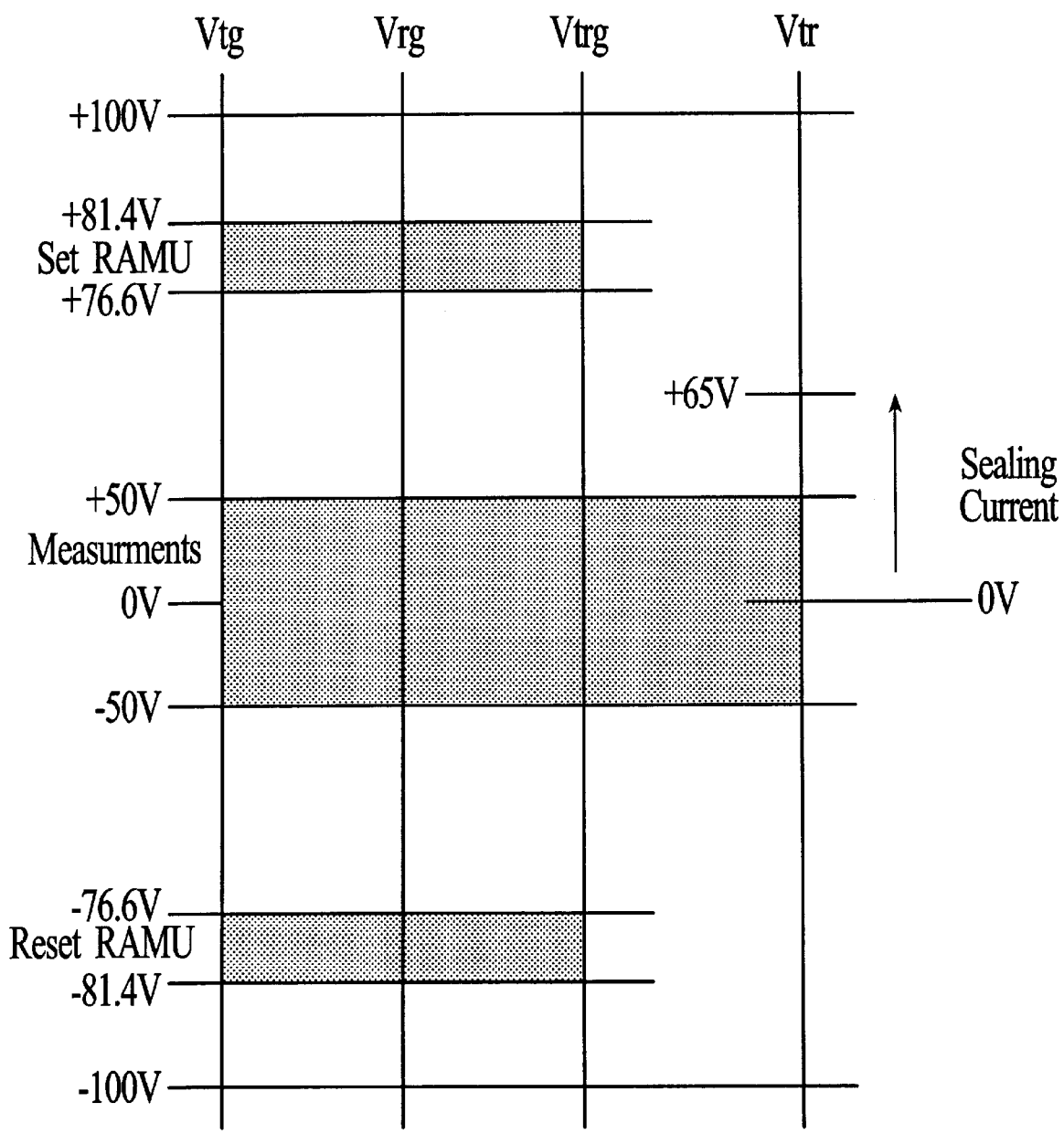
FIG. 8 illustrates a specific example of the RAMU signaling definition used in the present invention.

FIG. 8 illustrates a specific RAMU Signaling Definition for the circuit as shown in FIG. 7, which represents one RAMU and one specific voltage level that the RAMU can be signaled/addressed.

From the previous discussion, it is easy to understand that multiple RAMUs can be connected on the same line functioning at different addressing voltage levels in order to locate and determine the type of fault. By having a sequence of RAMUs, one can determine the exact location of a fault, by invoking consecutive RAMUs. In addition, by changing the level of the voltage values of the zener diodes, a particular RAMU can be actuated by providing a particular voltage. In other words, each RAMU can be defined/designed with different levels of voltage sensitivity. In other embodiments, other components can be substituted for the specific components described herein so long as these components perform essentially identical functions as described herein.

In the previous descriptions, numerous specific details are set forth, such as specific functions, components, etc., to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

I claim:

1. A method of detecting and locating faults on a copper loop, the copper loop connecting a test head located at a central office to a customer end unit, the method comprising:

positioning one or more remotely addressable maintenance units (RAMUs) at one or more locations on the copper loop, wherein each RAMU includes:
   means for detecting the polarity and magnitude of a voltage that is applied from the central office;
   means for selecting the polarity of a reference voltage based on the polarity of the applied voltage; and
   means for comparing the applied voltage with the reference voltage;

setting each of the one or more RAMUs to a reset mode or a set mode based on the polarities and magnitudes of the applied and the reference voltages; and detecting and locating faults on the copper loop upon setting each of the one or more RAMUs to the reset mode or set mode.

2. A method according to claim 1, wherein the reset mode comprises a normal mode and the set mode comprises a testing or maintenance mode.

3. A method according to claim 1, wherein the reset mode is actuated when the polarity of the applied voltage is negative and the magnitude of the applied voltage is greater than the magnitude of the reference voltage.

4. A method according to claim 1, wherein the set mode is actuated when the polarity of the applied voltage is positive and the magnitude of the applied voltage is greater than the magnitude of the reference voltage.

5. A method according to claim 1, wherein the step of setting each of the one or more RAMUs comprises actuating one or more relays.

6. A method according to claim 5, wherein each relay comprises one of a latching or solid state relay.

7. A method according to claim 1, wherein the reference voltage is adjustable.

8. A method according to claim 1, wherein the detecting means comprises a signal detector.

9. A method according to claim 1, wherein the comparing means comprises a level comparator.

10. An apparatus that detects and locates a fault in a copper loop having a tip and a ring, the copper loop connecting a test head located at a central office to a customer end unit, the apparatus comprising:

a signal detector coupled to the tip and ring and adapted to detect the polarity and the magnitude of a voltage that is applied at the tip, the ring, or the ring and tip with respect to the ground within the central office;
    a reference polarity selector adapted to select the polarity of a reference voltage based on the polarity of the applied voltage;
    a level comparator adapted to compare the applied voltage with the reference voltage and generate an enable signal;
    a fixed voltage driver adapted to receive the enable signal from the comparator; and
    a relay adapted to be actuated such that the fault on the copper loop can be detected and located.

11. An apparatus according to claim 10, wherein the signal detector comprises a plurality of diodes and transistors.

12. An apparatus according to claim 10, wherein the relay comprises one of a latching or solid state relay.

13. An apparatus according to claim 10, wherein the relay is actuated when the magnitude of the applied voltage is greater than the magnitude of the reference voltage.

14. An apparatus according to claim 13, wherein the relay is actuated to a reset mode when the polarity of the applied voltage is negative and the magnitude of the applied voltage is greater than the magnitude of the reference voltage.

15. An apparatus according to claim 14, wherein the relay is actuated to a set mode when the polarity of the applied voltage is positive and the magnitude of the applied voltage is greater than the magnitude of the reference voltage.

16. An apparatus according to claim 15, wherein the reset mode comprises a normal mode and the set mode comprises a testing or maintenance mode.

* * * * *